United States Patent
Beyer et al.

(10) Patent No.: US 10,117,215 B2
(45) Date of Patent: Oct. 30, 2018

(54) METHOD AND DEVICE FOR HOTSPOT DETECTION BASED ON ERRONEOUS USER LOCATION DATA

(71) Applicant: DEUTSCHE TELEKOM AG, Bonn (DE)

(72) Inventors: Juergen Beyer, Netphen (DE); Marc Christian Hipke, Bonn (DE); Ole Klein, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/534,521

(22) PCT Filed: Dec. 21, 2015

(86) PCT No.: PCT/EP2015/080743
§ 371 (c)(1),
(2) Date: Jun. 9, 2017

(87) PCT Pub. No.: WO2016/113081
PCT Pub. Date: Jul. 21, 2016

(65) Prior Publication Data
US 2017/0339659 A1   Nov. 23, 2017

(30) Foreign Application Priority Data
Jan. 16, 2015 (EP) .................................... 15151385

(51) Int. Cl.
*H04W 64/00* (2009.01)
*H04W 16/24* (2009.01)
*H04W 84/12* (2009.01)

(52) U.S. Cl.
CPC ........... *H04W 64/00* (2013.01); *H04W 16/24* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2010/0124930 A1* | 5/2010 | Andrews | ............... | H04W 16/10 455/436 |
| 2010/0151875 A1* | 6/2010 | Kim | ................... | H04W 72/082 455/452.2 |

(Continued)

FOREIGN PATENT DOCUMENTS

| | | | | |
|---|---|---|---|---|
| CN | 102325331 A | * | 1/2012 | |
| CN | 102325331 A | | 1/2012 | |
| WO | WO-2015143659 A1 | * | 10/2015 | ........... G01S 5/0242 |

OTHER PUBLICATIONS

Ho Ting Cheng et al: "Step-Wise Optimal Low Power Node Deployment in LTE Heterogeneous Networks", Vehicular Technology Conference (VTC Fall), 2012 IEEE, IEEE, Sep. 3, 2012 (Sep. 3, 2012), pp. 1-4, XP032294931.

*Primary Examiner* — Mounir Moutaouakil
(74) *Attorney, Agent, or Firm* — Leydig, Voit & Mayer, Ltd.

(57) ABSTRACT

A method for hotspot detection includes: computing, by a device, a ratio of a local user density within a first distance zone of a user density map towards a hotspot center point candidate to a local user density within a second distance zone of the user density map towards the same hotspot center point candidate; if the computed ratio exceeds a threshold, assigning, by the device, particular candidate points of the user density map within a certain distance to the hotspot center point candidate to a hotspot, the hotspot representing a concentrated conglomeration of users of the mobile communication network; and detecting, by the device, a center point of the hotspot based on the particular candidate points assigned to the hotspot.

15 Claims, 11 Drawing Sheets

Fig. 1

(56) References Cited

U.S. PATENT DOCUMENTS

| | | | |
|---|---|---|---|
| 2013/0090126 A1* | 4/2013 | Xing | H04B 7/0617 455/452.1 |
| 2013/0094397 A1* | 4/2013 | Kim | H04W 40/246 370/254 |
| 2013/0115961 A1* | 5/2013 | Shibayama | H04W 16/18 455/446 |
| 2014/0355484 A1* | 12/2014 | Foster | H04W 24/02 370/255 |
| 2014/0369285 A1* | 12/2014 | Li | H04W 24/02 370/329 |
| 2016/0227507 A1* | 8/2016 | Uchino | H04W 64/00 |

* cited by examiner

METHOD AND DEVICE FOR HOTSPOT DETECTION BASED ON ERRONEOUS USER LOCATION DATA

CROSS-REFERENCE TO RELATED APPLICATIONS

This application is a U.S. National Phase application under 35 U.S.C. § 371 of International Application No. PCT/EP2015/080743, filed on Dec. 21, 2015, and claims benefit to European Patent Application No. EP 15151385.0, filed on Jan. 16, 2015. The International Application was published in English on Jul. 21, 2016 as WO 2016/113081 under PCT Article 21(2).

TECHNICAL FIELD

The present disclosure relates to a method and a device for hotspot detection based on erroneous user location data, in particular for detecting a concentrated conglomeration of users of a mobile communication network.

BACKGROUND

Network densification is one key element to handle the increasing mobile radio traffic demand. Since network densification of homogeneous macro layer has already reached its limit in many cities, heterogeneous networks (HetNet) consisting of small cells (e.g., pico cells) with overlaying macro cells provide a promising network layout to fulfill future requirements.

Pico cells are particularly suited to serve spatially limited areas with high user density which are generally called hotspots. At least as long as frequency bands above 3 GHz are not available for mobile radio communication, pico and macro cells will run on the same carrier frequencies. In that co-channel mode the high performance area of pico cells is in the range of 30-50 m around the pico site. To provide good performance to the mobile radio users this high performance area should match the hotspot and, therefore, the hotspot location has to be known quite precisely. This is also true for other deployment scenarios to serve hotspots, such as vertical sectorization or smart eNodeB antennas.

User localization in mobile radio networks has been a topic for many years for operators and network technology suppliers. But with introducing clear user localization precision requirements for emergency calls in the USA and also since location-based applications have become more popular, improvements of user localization methods have gotten more attention. With the clear trend towards smart phones, the amount of mobile phones equipped with Global Positioning System (GPS) receivers also increases. But even GPS is not reliable everywhere (e.g., urban street canyons, inside of buildings), or the network operators have no access to the GPS data for private security reasons. A relatively old network-based localization method is fingerprinting where the received power from several base stations is used to estimate the user location. Taking account further information, such as timing advance, reference power measurements, etc., the mean localization error is ranged between 30 and 50 m. In LTE Release 9 specific positioning reference signals (PRS) are introduced enabling Time Difference Of Arrival (TDOA) approaches in the downlink. Generally, TDOA-based localization is less precise for non-line-of-sight (NLOS) and at least 3 eNodeB sites have to be involved. Under a realistic interference situation the localization error is not much better than 40 m but assuming that the interfering cells are muted during the measurement period the mean location error could be reduced to approximately 20 m. LTE Rel. 11 enables TDOA in the uplink too. However, it needs some years to reach a sufficient share of user equipments (UEs) supporting LTE Rel. 9 or higher. Thus, for a short term pico site rollout network operators have to rely on fingerprint-based user localization methods with the corresponding localization error in the range of 50 m.

There is a need for simple and precise detection of hot spots, i.e. spatially limited areas with high user density.

SUMMARY

In an exemplary embodiment, the invention provides a method for hotspot detection. The method includes: computing, by a device, a ratio of a local user density within a first distance zone of a user density map towards a hotspot center point candidate to a local user density within a second distance zone of the user density map towards the same hotspot center point candidate; if the computed ratio exceeds a threshold, assigning, by the device, particular candidate points of the user density map within a certain distance to the hotspot center point candidate to a hotspot, the hotspot representing a concentrated conglomeration of users of the mobile communication network; and detecting, by the device, a center point of the hotspot based on the particular candidate points assigned to the hotspot.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
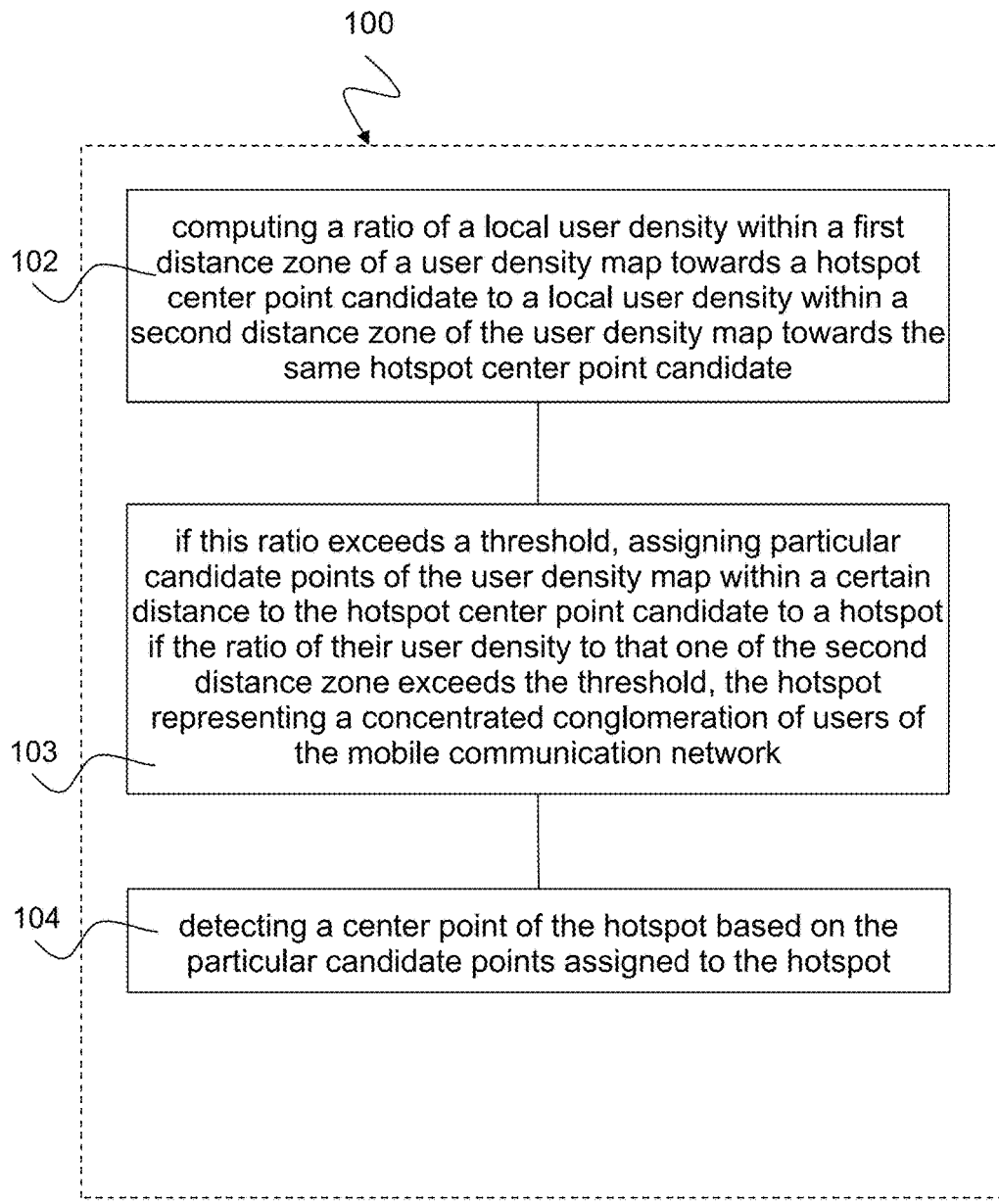
FIG. 1 shows a schematic diagram illustrating a method 100 for hotspot detection according to an implementation form.

Exemplary embodiments of the invention provide for simple and precise detection of hot spots.

Exemplary embodiments of the invention provide for hotspot detection wherein the localization precision of an individual user is not critical since the localization data of many users can be taken into account.

In order to describe the invention in detail, the following terms, abbreviations and notations will be used:
HetNet: Heterogeneous Network
eNodeB: Base station
LTE: Long Term Evolution
UE: User Equipment
PRS: Positioning Reference Signals
TDOA: Time Difference Of Arrival
NLOS: Non Line Of Sight According to a first aspect, the invention relates to a method for hotspot detection based on erroneous user location data, the method comprising: computing the ratio of the local user density within a first distance zone of the user density map towards a hotspot center point candidate to the local user density within a second distance zone of the user density map towards the same hotspot center point candidate and, if this ratio exceeds a specific threshold, assigning particular candidate points of the user density map within a certain distance to the hotspot center point candidate to a hotspot if the ratio of their user density to that one of the second distance zone exceeds the previously mentioned threshold, the hotspot representing a concentrated conglomeration of users of the mobile communication network; and detecting a center point of the hotspot based on the particular candidate points assigned to the hotspot.

Such a method has the advantage that it allows a computationally efficient implementation for detecting a hotspot. By using the two distance zones around a particular candidate point that is supposed to be the hotspot center point in each iteration of the method, the method can precisely detect hotspots in the user density map.

In an implementation form of the method the user density map comprises a grid of squares, each square representing a local user density within a local area of the mobile communication network. Such grid-based user density will be the outcome of future localization systems.

For hotspot detection the localization precision of an individual user is not critical since the localization data of many users can be taken into account by using the grid-based user density map.

In an implementation form the method comprises: computing the local user density within the first distance zone of the user density map based on a ratio of a number of users within the first distance zone to a size of the first distance zone; and computing the local user density within the second distance zone of the user density map based on a ratio of a number of users within the second distance zone to a size of the second distance zone.

By such computing procedure densities within different distance zones of the map can be efficiently and precisely determined.

In an implementation form of the method the first distance zone and the second distance zone are non-overlapping sections of the user density map.

This has the advantage that different distance zones of the user density map can be exactly compared against each other.

In an implementation form of the method the first distance zone and the second distance zone are separated by at least one further distance zone around the particular candidate point.

This has the advantage that the ratio can depend on a distance of the second distance zone to the candidate point. An extension of the first distance zone can be adjusted.

In an implementation form of the method the first distance zone and the second distance zone are circle rings around the particular candidate point.

Such circle rings are symmetric structures and hence easy to compute. Circle rings are well suited for modeling a conglomerate of users.

In an implementation form of the method the local user density is computed
according to the following relation:

$$u_{dens}(i_r) = \frac{N_u(i_r)}{A(i_r)},$$

where $i_r$ is an index of a particular circle ring around the particular candidate point, $A(i_r)$ is the size of the particular circle ring, $N_u(i_r)$ is the number of users within the particular circle ring and $u_{dens}(i_r)$ is the local user density within the particular circle ring.

This has the advantage that the local user density is time efficient to compute, in particular when using a large number of candidate points and/or high resolution density maps.

In an implementation form of the method the ratio of the local user density within the first distance zone to the local user density within the second distance zone is computed
according to the following relation:

$$\rho_{userdens} = \frac{\text{mean}(u_{dens}(r < r_{hs}))}{\text{mean}(u_{dens}(r_1 < r < r_2))},$$

where r is a distance to the particular candidate point, $r_{hs}$ is a radius of the first distance zone, $r_1$ and $r_2$ are inner and outer radius of the second distance zone, respectively, for example set to $r_1$=200 m and $r_2$=300 m, and mean() is an average. Any other values for the radii can be applied as well.

This has the advantage that the ratio is time efficient to compute and can be flexibly adjusted by varying the radius of the first distance zone and the extension of the second distance zone.

In an implementation form of the method the threshold is between 1.5 and 2.5, in particular between 1.75 and 2.25, in particular about 2.

Simulations have shown that such parameters provide optimum results.

In an implementation form the method comprises detecting a center point of the hotspot based on computing a balance point of the particular candidate points assigned to the hotspot.

The center point indicates an exact location of the hotspot. By applying balance point computation to different candidate points assigned to the hotspot, the exact location of the hotpot can be determined in a time efficient manner.

In an implementation form of the method the user density map comprises a grid of squares and the particular candidate points assigned to the hotspot are squares of the grid.

When the particular candidate points assigned to the hotspot are squares of the grid the balance point can be computed in a time efficient manner as only a small number of particular candidate points have to be considered.

The center point indicates an exact location of the hotspot, By applying balance point computation to different candidate points assigned to the hotspot, the exact location of the hotspot can be determined in a time efficient manner.

This has the advantage that weighting the particular candidate points by the number of users is allowed in a computationally efficient implementation.

According to a second aspect, the invention relates to a device for hotspot detection based on erroneous user location data, the device comprising: a processor configured for computing a ratio of a local user density within a first distance zone of a user density map towards a hotspot center point candidate to the local user density within a second distance zone of the user density map towards the same hotspot center point candidate and, if this ratio exceeds a specific threshold, assigning particular candidate points of the user density map within a certain distance to the hotspot center point candidate to a hotspot if the ratio of their user density to that one of the second distance zone exceeds the previously mentioned threshold, the hotspot representing a concentrated conglomeration of users of the mobile communication network; and wherein the processor is further configured for detecting a center point of the hotspot based on the particular candidate points assigned to the hotspot.

Such a device has the advantage that it allows a computationally efficient implementation for detecting a hotspot. By using the two distance zones around a particular candidate point the device can precisely detect hotspots in the user density map.

In an implementation form the device comprises: an interface to a user localization system for receiving the user density map.

This has the advantage that realistic data can be provided by the user localization system in order to improve the detection efficiency of the hotspot detection device.

In an implementation form of the device, the first distance zone and the second distance zone are circle rings around the particular candidate point.

Such circle rings are symmetric structures and hence can be computed in a time efficient manner. Circle rings are well suited for modeling a conglomerate of users.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step. Further, it is understood that the features of the various exemplary aspects described herein may be combined with each other, unless specifically noted otherwise.

The devices and methods described herein may be applied to hotspot detection. A hotspot is a spatially limited area with high user density or a concentrated conglomeration of users, e.g. of a mobile communication network.

In the following description methods and devices for hotspot detection are described. The described devices and systems may include integrated circuits and/or passive components and may be manufactured according to various technologies. For example, the circuits may include logic integrated circuits, analog integrated circuits, mixed signal integrated circuits, optical circuits, memory circuits and/or integrated passive components.

FIG. 1 shows a schematic diagram illustrating a method 100 for hotspot detection based on erroneous user location data according to an implementation form. The method 100 includes computing 102 a ratio of a local user density within a first distance zone of a user density map towards a hotspot center point candidate to a local user density within a second distance zone of the user density map towards the same hotspot center point candidate and, if this ratio exceeds a threshold, assigning 103 particular candidate points of the user density map within a certain distance to the hotspot center point candidate to a hotspot if the ratio of their user density to that one of the second distance zone exceeds the threshold, the hotspot representing a concentrated conglomeration of users of the mobile communication network; and detecting 104 a center point of the hotspot based on the particular candidate points assigned to the hotspot.

The method 100 as described above represents a two-stage process. First, it is checked if the basic requirements for a hotspot are given for some particular candidate points of the user density map (see steps 102 and 103). Then, those particular candidate points fulfilling the basic requirements for a hotspot are checked in order to find the center point of the hotspot (see step 104).

The user density map may be a user density map as described below with respect to FIG. 2. The user density map may include a grid of squares, for example squares having a size of about 15 meters times about 15 meters, each square representing a local user density within a local area of the mobile communication network. The user density map including the grid of squares may be a map as described below with respect to FIG. 3.

The method 100 may include computing the local user density within the first distance zone of the user density map based on a ratio of a number of users within the first distance zone to a size of the first distance zone; and computing the local user density within the second distance zone of the user density map based on a ratio of a number of users within the second distance zone to a size of the second distance zone, e.g. as described below with respect to FIG. 4.

The first distance zone and the second distance zone may be non-overlapping sections of the user density map. The first distance zone and the second distance zone may be separated by at least one further distance zone around the particular candidate point. The first distance zone and the second distance zone may be circle rings around the particular candidate point as described below with respect to FIG. 4. The local user density may be computed according to the following relation:

$$u_{dens}(i_r) = \frac{N_u(i_r)}{A(i_r)},$$

where $i_r$ is an index of a particular circle ring around the particular candidate point, $A(i_r)$ is the size of the particular circle ring, $N_u(i_r)$ is the number of users within the particular circle ring and $u_{dens}(i_r)$ is the local user density within the particular circle ring.

The ratio of the local user density within the first distance zone to the local user density within the second distance zone may be computed according to the following relation:

$$\rho_{userdens} = \frac{\text{mean}(u_{dens}(r < r_{hs}))}{\text{mean}(u_{dens}(r_1 < r < r_2))},$$

where $r$ is a distance to the particular candidate point, $r_{hs}$ is a radius of the first distance zone, $r_1$ and $r_2$ are inner and outer radius of the second distance zone, respectively, for example set to $r_1=200$ m and $r_2=300$ m, and mean( ) is an average.

The threshold may be between 1.5 and 2.5, in particular between 1.75 and 2.25, in particular about 2. The method 100 may include detecting a center point of the hotspot based on computing a balance point of the particular candidate points assigned to the hotspot. The user density map may include a grid of squares and the particular candidate points assigned to the hotspot are squares of the grid. The method 100 may include detecting the center point of the hotspot based on a sum over coordinates of the particular candidate points assigned to the hotspot, wherein the particular candidate points are weighted by a number of users of the grid square corresponding to the respective candidate point.

Figure 2:
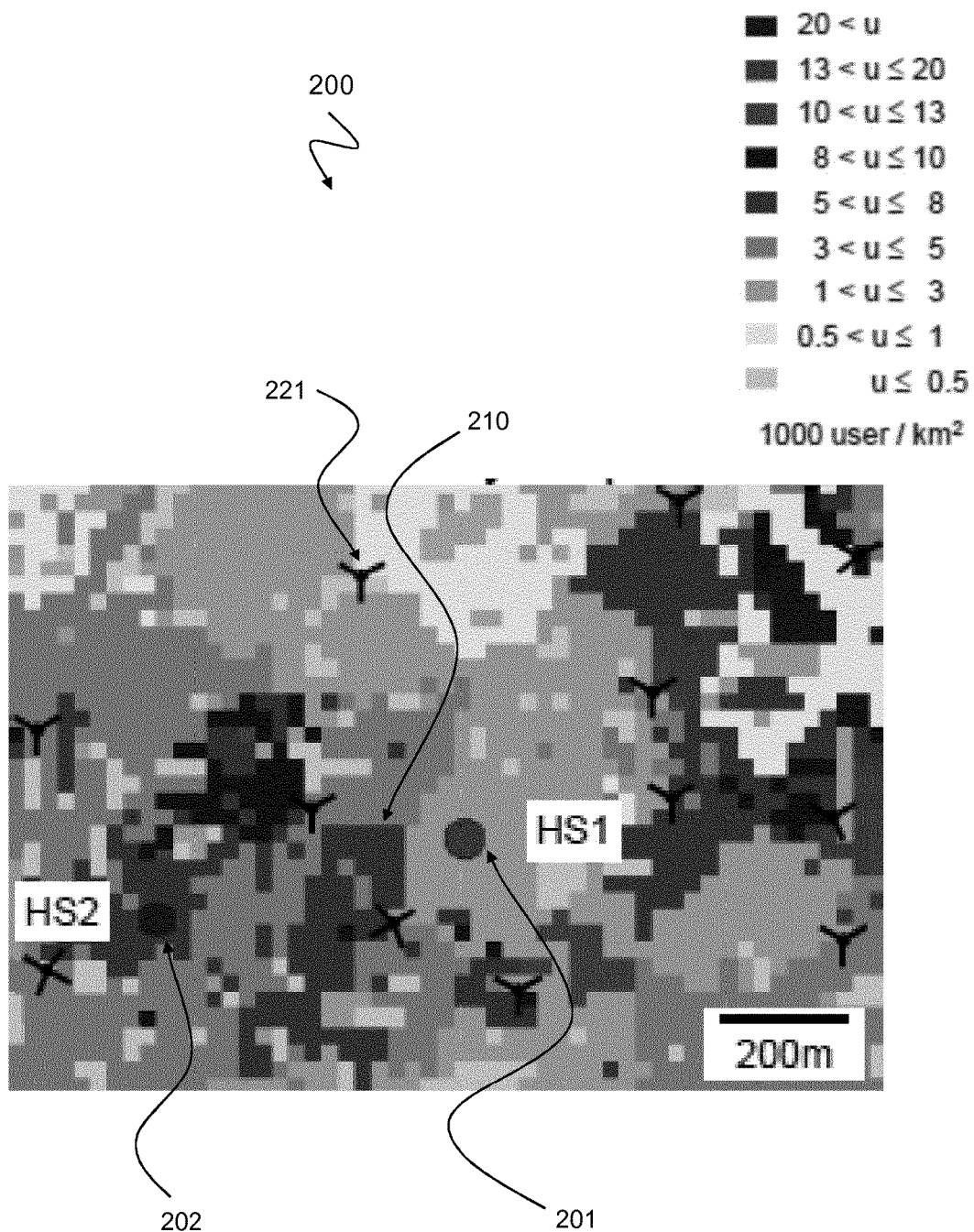
FIG. 2 shows a diagram illustrating an exemplary user density map 200 usable for hotspot detection, the map including a first hotspot HS1 and a second hotspot HS2.

FIG. 2 shows a diagram illustrating an exemplary user density map 200 usable for hotspot detection, the map including a first hotspot HS1, 201 and a second hotspot HS2, 202.

The map of FIG. 2 shows a part of a commercial radio network in Cologne, Germany consisting of macro cells 221. Although the regarded area is in the city center the inter site distance as well as the amount of traffic per cell differs significantly. The user density map 200 is derived from cell traffic measurements. The pixel size of the user density map is 20×30 m.

Two hotspots 201, 202 are shown in this user density map 200. Hotspot 1, 201 is in a large macro cell of about 130,000 m$^2$ with low traffic (average user density=2,300 user/km$^2$). Of particular interest is the high traffic area 210 left of hotspot 1, 201 which belongs to the neighbor macro cell. This hotspot location demonstrates the difficulties for hotspot detection if a hotspot is close to another high traffic area. Hotspot 2, 202 is in a smaller macro cell of about 40,000 m$^2$ with more traffic (average user density=4,600 user/km$^2$).

Figure 3:
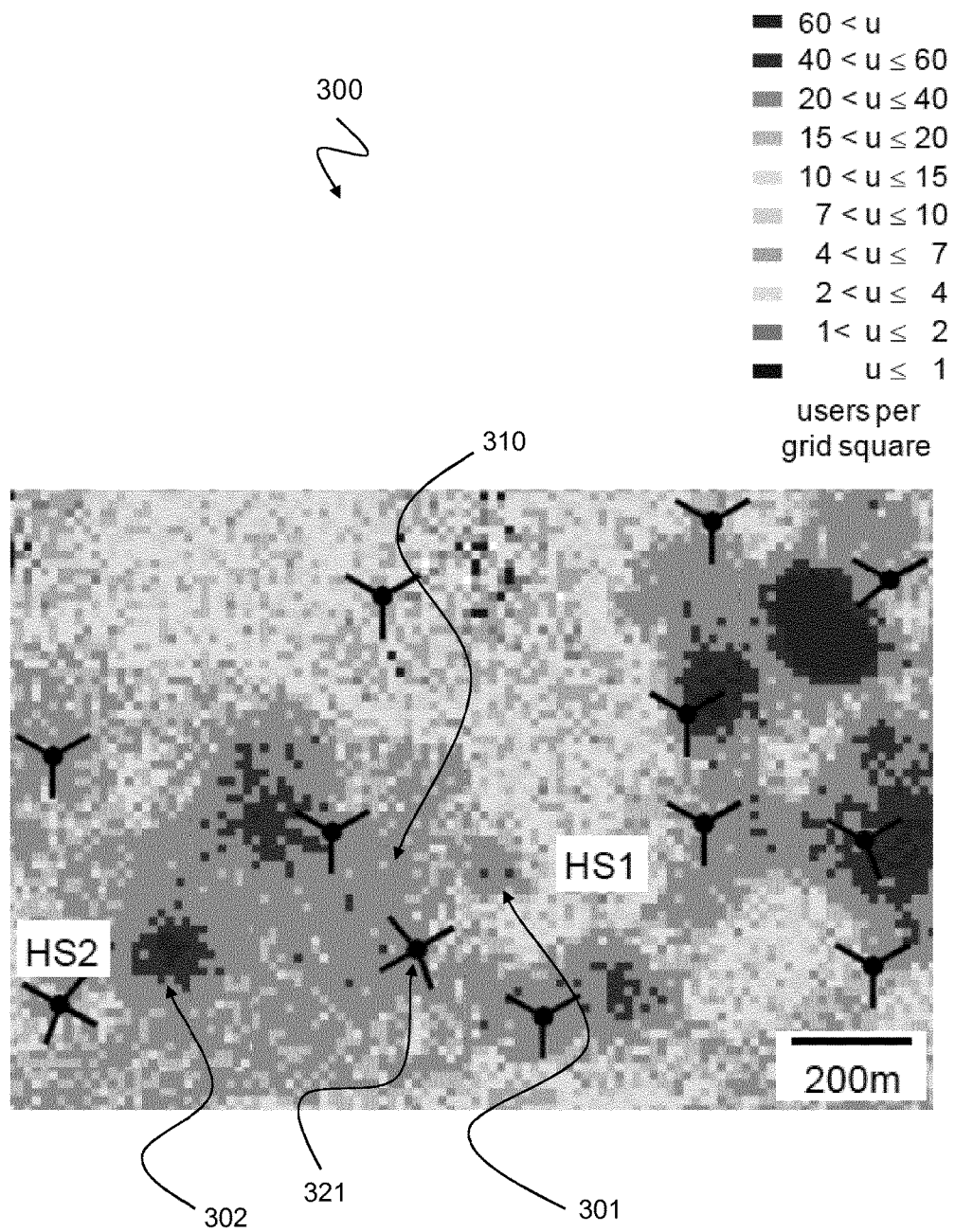
FIG. 3 shows a diagram illustrating an exemplary grid-based user density map 300 including erroneous user locations, the map being usable for hotspot detection.

FIG. 3 shows a diagram illustrating an exemplary grid-based user density map 300 including erroneous user locations, the map usable for hotspot detection. The grid-based user density map 300 of FIG. 3 shows the number of users per grid square for erroneous user location. Comparing that with the original user density map of FIG. 2 illustrates the impact of the user location error. In FIG. 3 hotspot 1, 301 cannot easily be recognized which is caused by the specific scenario. The macro cell 321 where hotspot 1, 301 is located has low average user density. Since the hotspot user density is computed relatively to the average macro user density hotspot 1, 301 has a quite low user density too. But left of hotspot 1—in the neighboring macro—is an area with high user density 310. That fact together with the impact of the erroneous user location makes it very difficult to visually recognize hotspot 1, 301 because hotspot 1, 301 and the region 310 left of hotspot 1, 301 have the same grey scaling in FIG. 3. Adapting the legend intervals might improve the visibility of hotspot 1, 301 which, of course, is not a general solution. Due to the much larger user density hotspot 2, 302 can clearly be seen.

Figure 4:
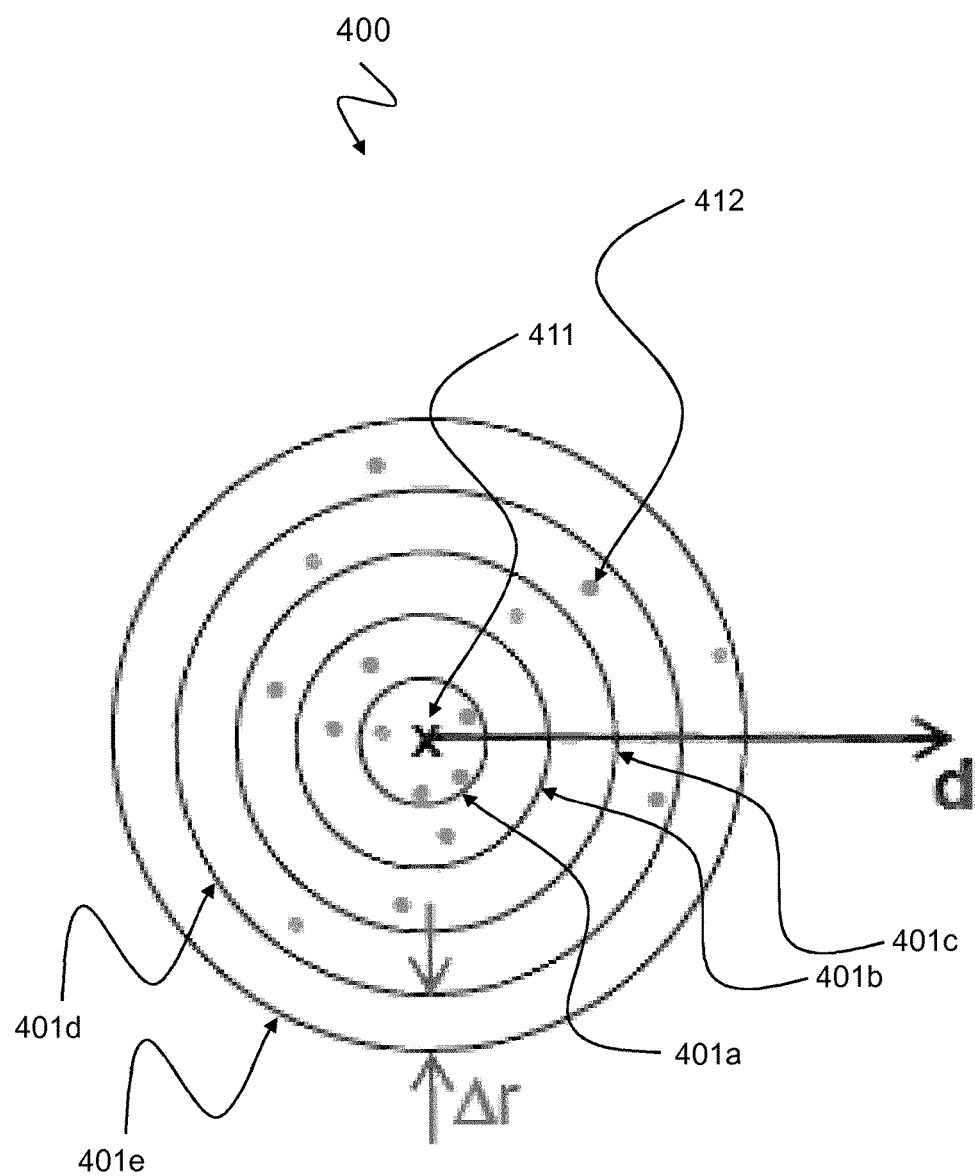
FIG. 4 shows a schematic diagram of a user density map 400 illustrating different circle rings around a hotspot center point according to a method for hotspot detection according to an implementation form.

FIG. 4 shows a schematic diagram of a user density map 400 illustrating different circle rings around a hotspot center point according to a method for hotspot detection according to an implementation form.

The diagram 400 corresponds to a user density map indicating a local density of users of a mobile communication network based on erroneous user location data. The method 100 as described above with respect to FIG. 1 may be applied to this user density map. For a plurality of candidate points 412 of the user density map a respective detection measure may be computed, wherein a detection measure for a particular candidate point 411 of the plurality of candidate points 412 is based on a ratio of a local user density within a first distance zone towards the particular candidate point, e.g. a first circle ring 401a, of the user density map to a local user density within a second distance zone towards the particular candidate point, e.g. a second circle ring 401b, of the user density map, the second distance zone 401b extending around the first distance zone 401a. The particular candidate point 411 may be assigned to a hotspot if its detection measure crosses a threshold, e.g. as described below with respect to FIG. 7, the hotspot representing a concentrated conglomeration of users of the mobile communication network. A center point of the hotspot may be detected based on the particular candidate points 411 assigned to the hotspot.

Instead of the second circle ring 401b other circle rings such as the third circle ring 401c, the fourth circle ring 401d or the fifth circle ring 401e may be used as the second distance zone to compute the local user density. The first distance zone and the second distance zone may also include other geometric forms, e.g. polygons or others around the particular candidate point 411. The first distance zone and the second distance zone may be symmetrically or asymmetrically formed around the particular candidate point 411.

The hotspot shape may be basically described by the user density ($u_{dens}$) within circle rings around the hotspot center point according to $$u_{dens}(i_r) = \frac{N_u(i_r)}{A(i_r)}, \qquad (1)$$

where $i_r$ is an index of a particular circle ring around the particular candidate point, $A(i_r)$ is the size of the particular circle ring, $N_u(i_r)$ is the number of users within the particular circle ring and $u_{dens}(i_r)$ is the local user density within the particular circle ring.

The radius increment of the circle rings may be about 20 m. That means, e.g., for $i_r=3$ all users within a distance between 40 and 60 m to the hotspot center are considered. In the case of grid based analysis the users are assigned to the corresponding grid squares at first and the user density computations are performed afterwards.

Figure 5:
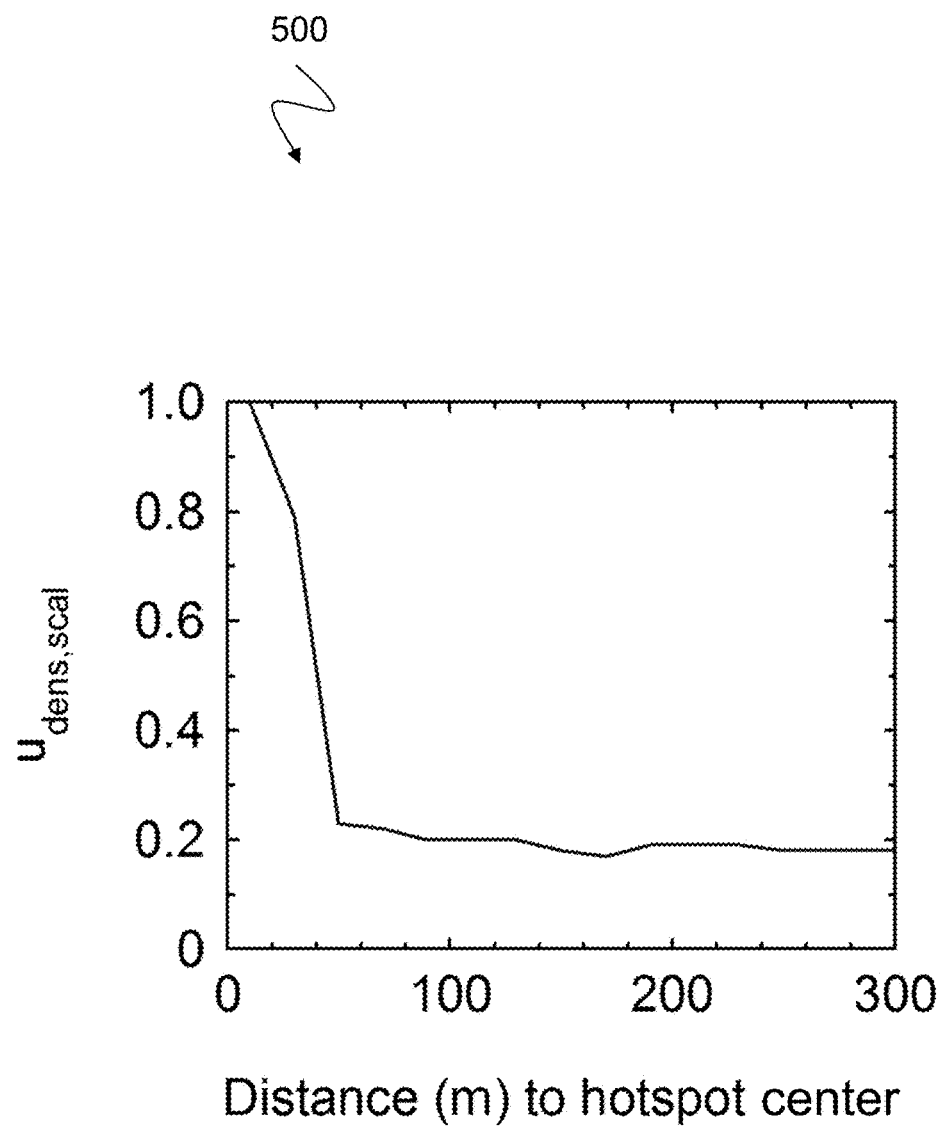
FIG. 5 shows a graph 500 illustrating an exemplary scaled user density versus distance to hotspot center point.

FIG. 5 shows a graph 500 illustrating an exemplary scaled user density versus distance to hotspot center point. The local user density may be scaled with respect to the first circle ring and computed according to the following relation:

$$u_{dens,scal}(i_r) = \frac{u_{dens}(i_r)}{N_{u,C}(1)}, \quad (2)$$

where $i_r$ is an index of a particular circle ring around the particular candidate point, $N_{u,C}(1)$ is the number of users within the first circle ring and $u_{dens}(i_r)$ is the non-scaled local user density within the particular circle ring.

Figure 6:
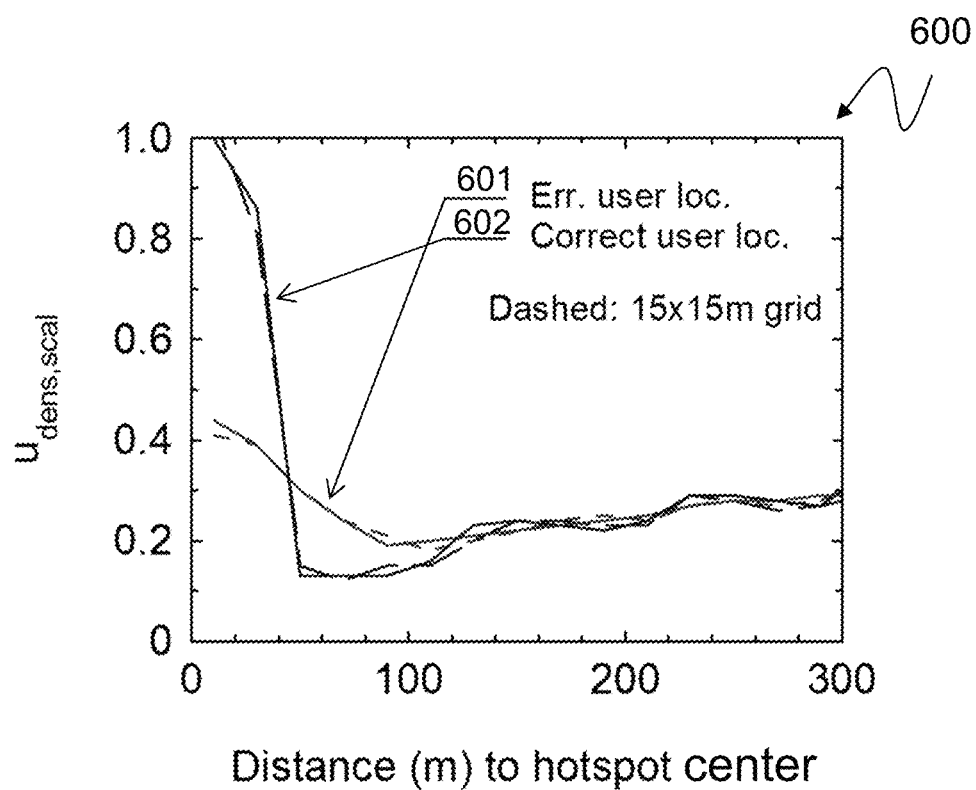
FIG. 6 shows a graph 600 illustrating an exemplary scaled user density versus distance to hotspot center point for the first hotspot HS1 depicted in FIG. 2.
Figure 7:
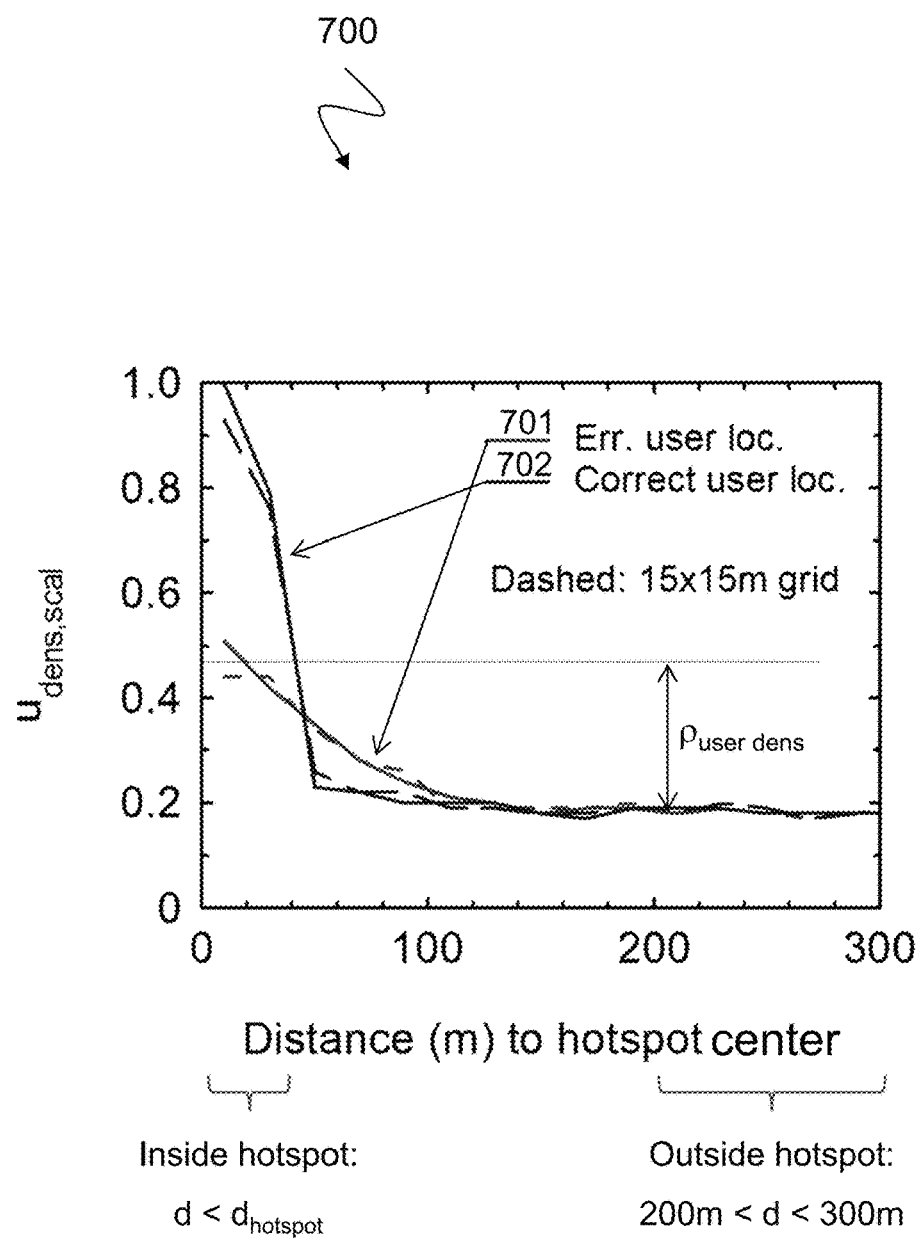
FIG. 7 shows a graph 700 illustrating an exemplary scaled user density versus distance to hotspot center point for the second hotspot HS2 depicted in FIG. 2 and a distance measure derived therefrom.

FIGS. 6 and 7 show the scaled user density per circle ring for both hotspots 301, 302. For better comparison equation (1) is scaled to the number of users with correct user location ($=N_{u,C}(1)$) in the 1st circle ring 401a—which is a circle of 20 m radius around the hotspot center 411:

$$u_{dens,scal}(i_r) = \frac{u_{dens}(i_r)}{N_{u,C}(1)}.$$

The erroneous user location data were simulated because up to now there exists no real system for providing such user location data. To demonstrate the accuracy of the method described in this disclosure, erroneous user location data were generated based on simulations. Due to the quite large mean user location error 601 of 50 m the user density inside the 40 m hotspot radius is significantly reduced by around 50% compared to the hotspot user density for correct user location 602. This is true for both hotspots 301, 302, but according to FIG. 6 the user density increases again well outside of hotspot 1, 301 and reaches almost the user density of the hotspot for erroneous user location 601. This is caused by the high user density area 310 left of hotspot 1 in the neighboring macro cell 321. Due to that high user density area 310 the user density increases for distance beyond 100 m which complicates to numerically detect this hotspot 301. This is not true for hotspot 2, 302 in FIG. 7. Assuming 'Correct user location' 702 its user density is clearly higher than outside the hotspot 302 and even for 'Erroneous user location' 701 the shape of the hotspot 302 is clear to see in FIG. 7. Thus, such a hotspot 302 can be numerically detected.

From comparing the solid (results based on individual user locations) and the dashed graphs (grid-based results) in FIGS. 6 and 7 it can be realized that assigning users to grid squares has only very low impact on the user density graphs. This is also true for squares of up to 50×50 m size which is the largest size regarded. One conclusion from FIGS. 6 and 7 is that the ratio of the user density inside the hotspot to the user density outside the hotspot represents a suitable measure for hotspot detection. The user density ration $\rho_{userdens}$ can be calculated by:

$$\rho_{userdens} = \frac{\text{mean}(u_{dens}(r < r_{hs}))}{\text{mean}(u_{dens}(r_1 < r < r_2))}, \quad (3)$$

where r is a distance to the particular candidate point, $r_{hs}$ is a radius of the first distance zone, $r_1$ and $r_2$ are inner and outer radius of the second distance zone, respectively, for example set to $r_1$=200 m and $r_2$=300 m, and mean( ) is an average.

The greater $\rho_{userdens}$ the better the hotspot can be detected.

Due to the stochastic processes the localization data of a certain number of users are taken into account to get a statistically reliable value for $\rho_{userdens}$. The number of users may be determined from a convergence investigation.

Figure 8:
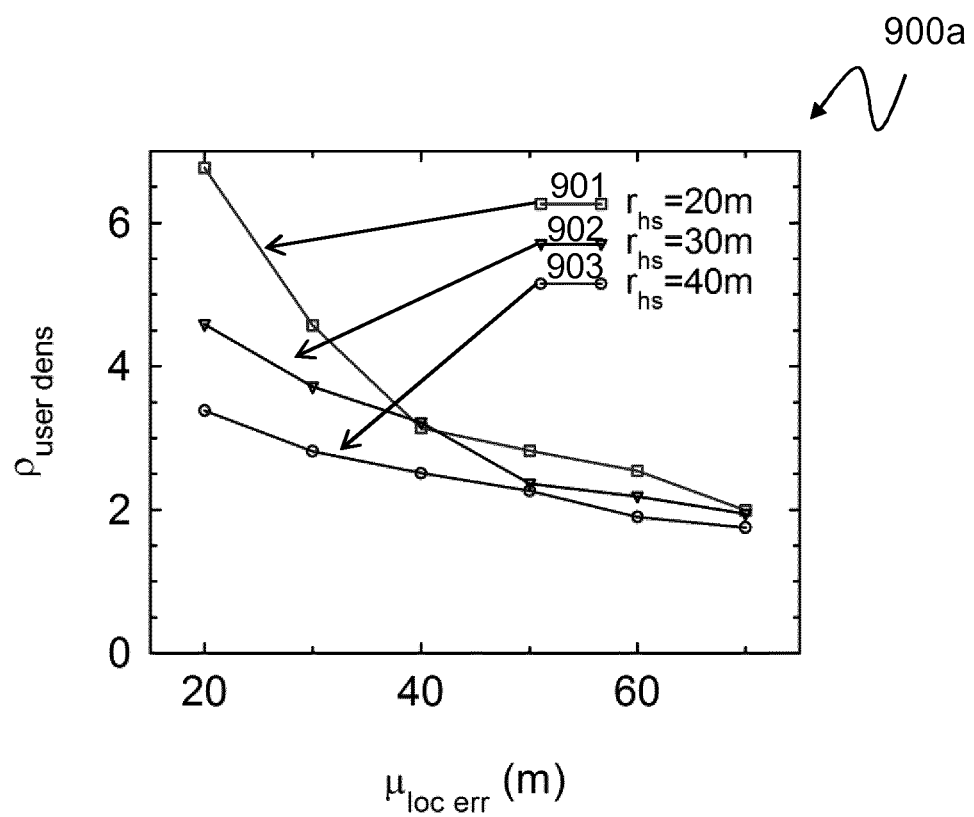
FIG. 8 shows a graph 900a illustrating an exemplary density ratio over the meanuser location error for different hotspot radii.

FIG. 8 shows a graph 900a illustrating an exemplary density ratio $\rho_{userdens}$ over the mean user location error $\mu_{loc\,err}$ for different hotspot radii. The following exemplary setting is applied: Homogeneous user distribution, grid squares of 15×15 m size, 20% of the macro users are in the hotspot ($p_{HS\,user}$=20%) For comparison: for $r_{hs}$=40 m and $p_{HS\,trf}$=20% the hotspot user density=5 times that one of the macro for the regarded hotspot 1.

$p_{HS\,trf}$ is equal for all hotspot radii ($r_{hs}$=20 m, 901; $r_{hs}$=30 m, 902; $r_{hs}$=40 m, 903) and, thus, the hotspot user density increases with decreasing $r_{hs}$. According to FIG. 8 the biggest impact of $\mu_{loc\,err}$ on $\rho_{userdens}$ is given for small hotspots ($r_{hs}$=20 m, 901) which clearly simplifies the hotspot detection for low $\mu_{loc\,err}$. For $r_{hs}$=30, 902 and $r_{hs}$=40 m, 903 $\rho_{userdens}$ also decreases with increasing $\mu_{loc\,err}$ but much slower. Thus, for such hotspot sizes it may be doubtful if it is worth to spend much effort to reduce $\mu_{loc\,err}$ from, e.g., 40 m to 30 m in a localization system. Assuming $\rho_{userdens}$=2 as lower threshold it is even possible to detect a hotspot for $\mu_{loc\,err}$=70 m; at least for the hotspot user density assumed for FIG. 8.

Figure 9:
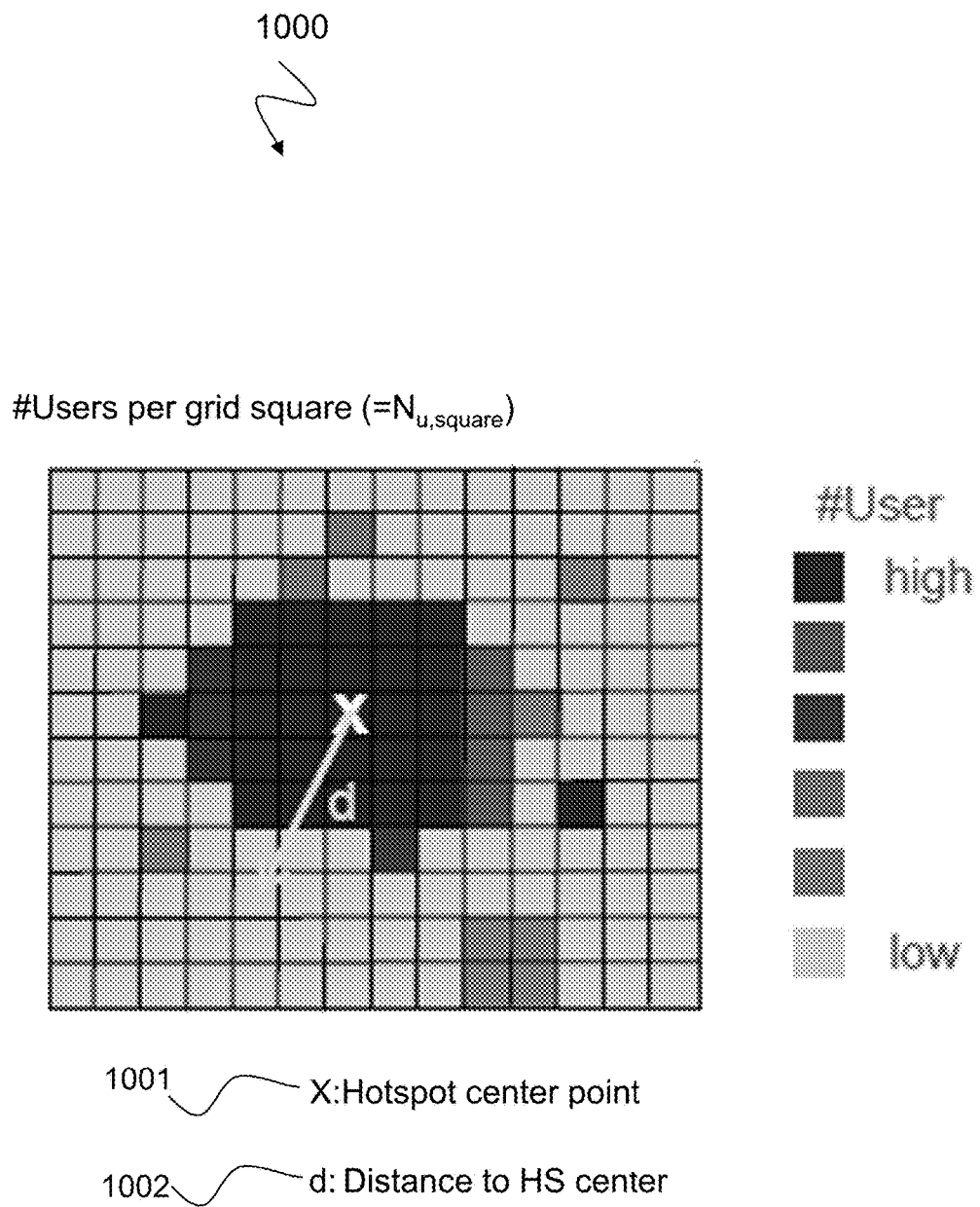
FIG. 9 shows a diagram 1000 illustrating an exemplary balance point of a hotspot.

FIG. 9 shows a diagram 1000 illustrating an exemplary balance point of a hotspot. The hotspot center point X, 1001 is assumed to be the balance point of those grid squares which are assigned to a hotspot. The center point 1001 of the hotspot may be detected based on computing the balance point of the particular candidate points 411 assigned to the hotspot as described above with respect to FIG. 4. The user density map may include a grid of squares and the particular candidate points 411 assigned to the hotspot may be squares of the grid. The center point 1001 of the hotspot may be detected based on a sum over coordinates 1002 of the particular candidate points 411 assigned to the hotspot, wherein the particular candidate points 411 may be weighted by a number of users of the grid square corresponding to the respective candidate point 411.

In that computation the grid squares are weighted with the number of users per square. A grid square may be regarded to be part of the hotspot if its user density is greater than n times the user density outside the hotspot or if its detection measure exceeds a threshold as described above with respect to FIG. 1. For n the same value may be applied as for the lower threshold for $\rho_{userdens}$ described above with respect to FIG. 7.

The hotspot center point may be determined as the balance point of the squares belonging to the hotspot. To evaluate which squares belong to the hotspot the following approach may be applied:

Average of $N_{u,square}$ outside the hotspot:

$N_{u,outside}$=mean $\{N_{u,square}$ (200<d<300 m)$\}$;

$N_{u,square}$ (d<300 m)>1.8·$N_{u,outside}$ ⇒ Square is assigned to the hotspot;

The value 1.8 is a rough estimation, other appropriate values may be applied;

Balance point computation: Squares are weighted with $N_{u,square}$.

By applying this approach to the hotspots 301, 302 of the user density map shown in FIG. 3 the following results are obtained. $\Delta_{HS\,center}$ is the distance detected to real hotspot center point. For hotspot 1 and low $p_{HS\,user}$ the value of $\Delta_{HS\,center}$ is quite large because of the area with high user density left of hotspot 1. For high $p_{HS\,user}$ the following is obtained: $\Delta_{HS\,center}$<20 m. For hotspot 2 the following is obtained: $\Delta_{HS\,center}$<20m. Under good condition the hotspot center point can be detected with sufficient precision, i.e., $\Delta_{HS\,center}$ is lower than the range of high performance area of co-channel pico cells.

Figure 10:
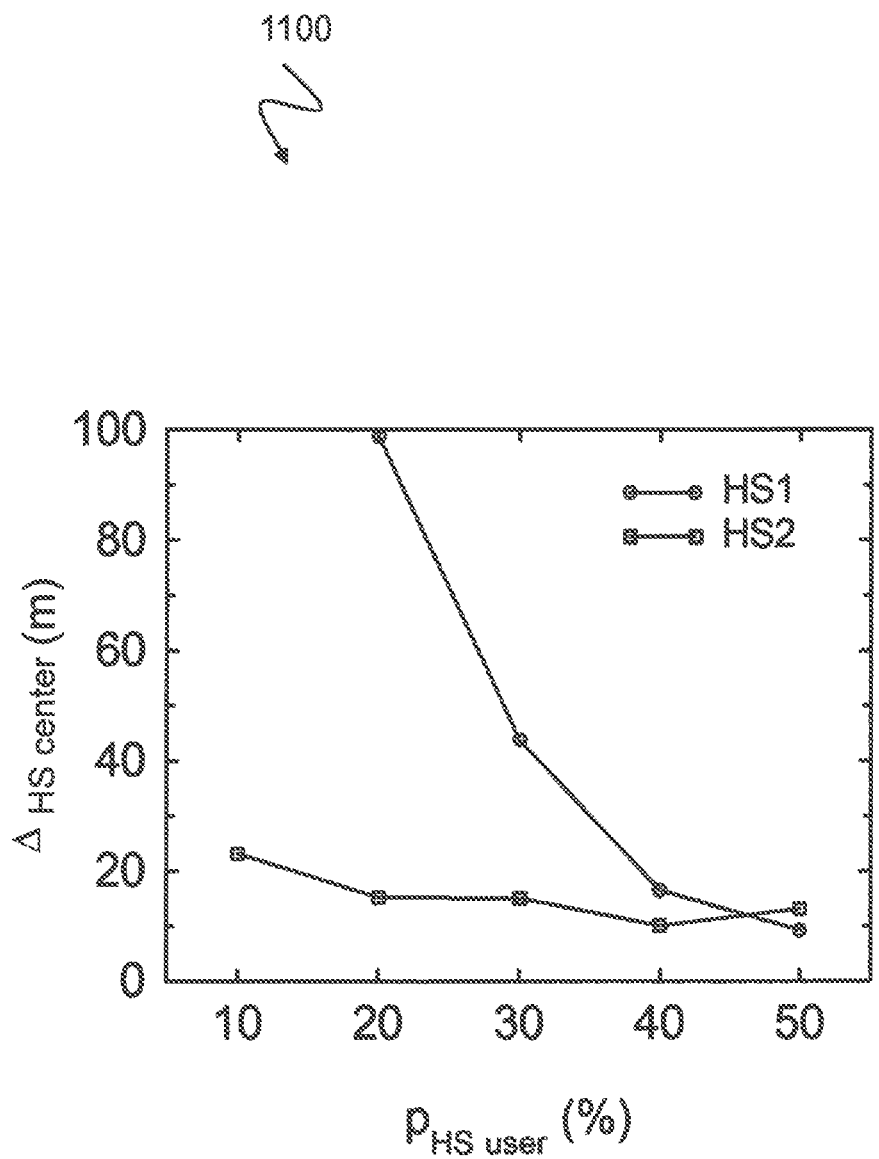
FIG. 10 shows a diagram 1100 illustrating an exemplary deviation of the detected hotspot center to the real one over the hotspot user share.

FIG. 10 shows a diagram 1100 illustrating an exemplary deviation of the detected hotspot center to the real one over the hotspot user share. The figure shows the deviation (=$\Delta_{HS\ center}$) between the real hotspot center point and that one detected by the previously described approach. For hotspot 1 $\Delta_{HS\ center}$ is very large which is caused by the high user density area left of the hotspot. Many grid squares of that region are—erroneously—assigned to hotspot 1. Only for very high number of hotspot users $\Delta_{HS\ center}$ reaches an acceptable range. For hotspot 2 $\Delta_{HS\ center}$ is between 10 m and 20 m. The computations are repeated for the complete range of parameters used for FIG. 8 and FIG. 9a and it was found that $\Delta_{HS\ center}$ is mainly ranged between 10 and 20 m. A clear relationship between $\Delta_{HS\ center}$ and any other parameters ($r_{hs}$, $p_{HS\ user}$ etc.) does not exist. However, since the high performance area of a co-channel pico cell reaches 30-50 m around the pico site the observed hotspot center point detection precision can be regarded as sufficient.

Figure 11:
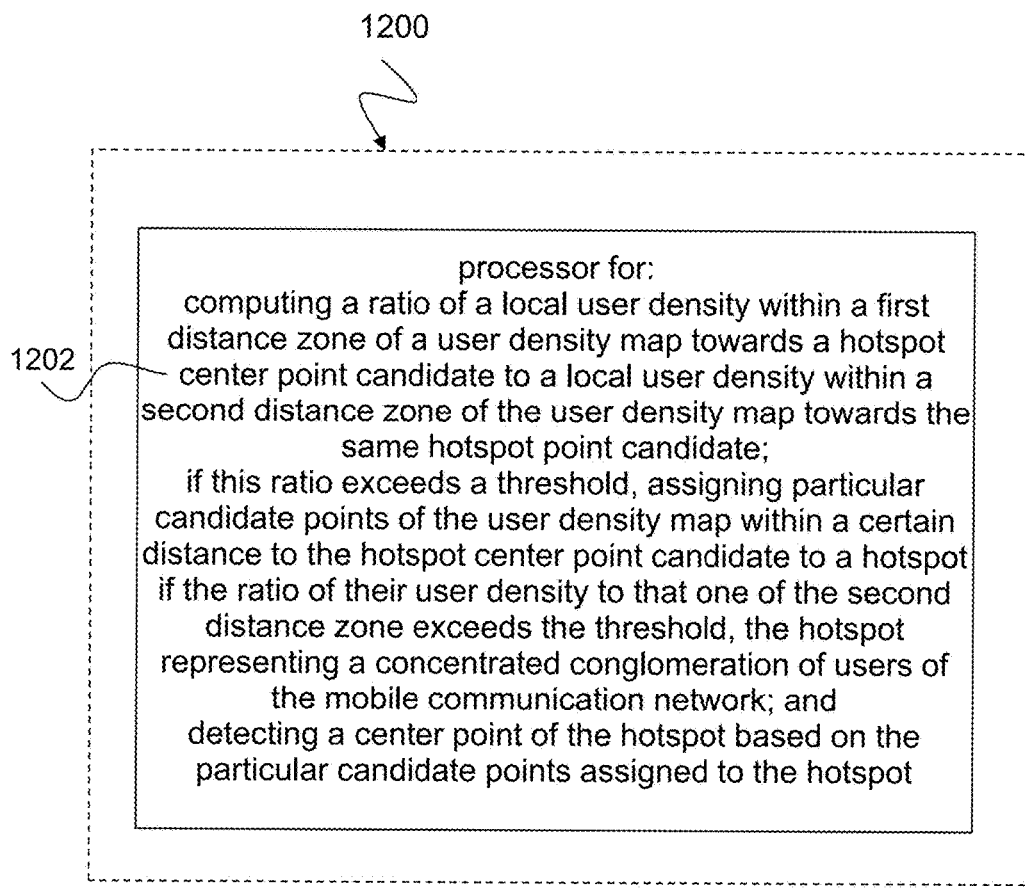
FIG. 11 shows a schematic diagram illustrating a device 1200 for hotspot detection according to an implementation form.

FIG. 11 shows a schematic diagram illustrating a device 1200 for hotspot detection based on user location data according to an implementation form. The device 1200 includes a processor 1202 configured for computing a ratio of a local user density within a first distance zone of a user density map towards a hotspot center point candidate to a local user density within a second distance zone of the user density map towards the same hotspot center point candidate and, if this ratio exceeds a threshold, assigning particular candidate points of the user density map within a certain distance to the hotspot center point candidate to a hotspot if the ratio of their user density to that one of the second distance zone exceeds the threshold, the hotspot representing a concentrated conglomeration of users of the mobile communication network; and detecting a center point of the hotspot based on the particular candidate points assigned to the hotspot.

The device 1200 may include an interface to a user localization system for receiving the user density map.

The device 1200 may be implemented as an electrical and/or optical circuit within a chip or as an integrated circuit or an application specific integrated circuit (ASIC). The device 1200 may be implemented in digital and/or analog electronic and optical circuitry.

By using the device 1200 or a method 100 as described above with respect to FIG. 1 numerical or visual hotspot detection is possible although the individual user locations are not exactly known. The users may be assigned to a grid of squares, e.g. with a default size of 15×15 m. In the graphs of the user density (as depicted in FIGS. 2 and 3) over the distance to the hotspot center the shape of the hotspot is clearly to see. The ratio of user density inside the hotspot to that one outside the hotspot (=$\rho_{userdens}$) is found to be a suited measure for numerical hotspot detection. The location data of less than 10,000 users per macro may be taken into account to get a reliable value for $\rho_{userdens}$. For hotspot radii greater than 20 m $\rho_{userdens}$ decreases quite slowly with increasing user location error. Thus, for hotspot detection it is not particularly important to have a high precision user localization system. The number of hotspot users should exceed about 20% of the number of macro users to be able to detect the hotspot. Thresholds for other hotspot parameters can be found from graphs provided in this disclosure. The difference between the detected hotspot center point and the real one is ranged between 10 and 20 m. Overall, the results presented in this disclosure verify that hotspot detection is possible even for a quite large mean user location error in the range of 50 m.

The methods, systems and devices described herein may be implemented as electrical and/or optical circuits within a chip or an integrated circuit or an application specific integrated circuit (ASIC). The invention can be implemented in digital and/or analog electronic and optical circuitry.

The methods, systems and devices described herein may be implemented as software in a Digital Signal Processor (DSP), in a micro-controller or in any other side-processor or as a hardware circuit within an application specific integrated circuit (ASIC) of a Digital Signal Processor (DSP).

The invention can be implemented in digital electronic circuitry, or in computer hardware, firmware, software, or in combinations thereof, e.g. in available hardware of conventional optical transceiver devices or in new hardware dedicated for processing the methods described herein.

The present disclosure also supports a computer program product including computer executable code or computer executable instructions that, when executed, causes at least one computer to execute the performing and computing steps described herein, in particular the method 100 as described above with respect to FIG. 1 and the techniques described above with respect to FIGS. 2 to 10. Such a computer program product may include a readable storage medium storing program code thereon for use by a computer. The program code may perform the method 100 as described above with respect to FIG. 1.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for detecting a center point of a hotspot, the method comprising:
    obtaining, by a device, from a user localization system, user localization data corresponding to a plurality of user devices, wherein the localization data corresponding to the plurality of user devices includes a user density map;
    determining, by the device, a plurality of candidate points corresponding to the hotspot, the hotspot representing a concentrated conglomeration of users of a mobile communication network, wherein determining each candidate point comprises:
        determining a ratio of a first local user density to a second local user density corresponding to a respective candidate point, wherein the first local user density corresponds to a first distance zone of the user density map and the second local user density corresponds to a second distance zone of the user density map; and
        determining that the ratio exceeds a threshold;
    determining, by the device, the center point of the hotspot based on the plurality of candidate points;
    outputting, by the device, the determined center point of the hotspot; and
    installing a small cell at the center point of the hotspot, wherein the small cell is configured to serve the concentrated conglomeration of users to communicate via the mobile communication network.

2. The method of claim 1, wherein the user density map comprises a grid of squares, each square representing a local user density within a local area of the mobile communication network.

3. The method of claim 1, further comprising:
    computing the first local user density based on a ratio ($\rho_{userdens}$) of a number of users within the first distance zone to a size of the first distance zone; and
    computing the second local user density based on a ratio ($\rho_{userdens}$) of a number of users within the second distance zone to a size of the second distance zone.

4. The method of claim 1, wherein the first distance zone and the second distance zone are non-overlapping distance zones of the user density map.

5. The method of claim 1, wherein the first distance zone and the second distance zone are separated by at least one further distance zone.

6. The method of claim 1, wherein the first distance zone and the second distance zone are circle rings around the respective candidate point.

7. The method of claim 6, wherein local user density is computed according to the following relation:

$$u_{dens}(i_r) = \frac{N_u(i_r)}{A(i_r)},$$

where $i_r$ is an index of a particular circle ring around the respective candidate point, $A(i_r)$ is the size of the particular circle ring, $N_u(i_r)$ is the number of users within the particular circle ring and $u_{dens}(i_r)$ is the local user density within the particular circle ring.

8. The method of claim 7, wherein the ratio ($\rho_{userdens}$) of the first local user density to the second local user density within the second distance zone is computed according to the following relation:

$$\rho_{userdens} = \frac{\text{mean}(u_{dens}(r < r_{hs}))}{\text{mean}(u_{dens}(r_1 < r < r_2))}$$

where r is a distance to the hotspot center point candidate, $r_{hs}$ is a radius of the first distance zone, $r_1$ and $r_2$ are inner and outer radius of the second distance zone, respectively, in particular set to $r_1$=200 m and $r_2$=300 m, and mean( ) is an average.

9. The method of claim 1, wherein the threshold is between 1.5 and 2.5.

10. The method of claim 1, wherein determining the center point of the hotspot based on the plurality of candidate points further comprises:
    computing a balance point of the plurality of candidate points.

11. The method of claim 10, wherein the user density map comprises a grid of squares and the plurality of candidate points are squares of the grid.

12. The method of claim 11, wherein determining the center point of the hotspot based on the plurality of candidate points is based on a sum over coordinates of the plurality of candidate points, wherein the plurality of candidate points are weighted by a number of users of the grid square corresponding to the respective candidate points.

13. A device for detecting a center point of a hotspot, the device comprising:
    a non-transitory computer-readable medium having processor-executable instructions stored thereon; and a processor, configured to execute the processor-executable instructions to facilitate:

obtaining, from a user localization system, user localization data corresponding to a plurality of user devices, wherein the localization data corresponding to the plurality of user devices includes a user density map;

determining a plurality of candidate points corresponding to the hotspot, the hotspot representing a concentrated conglomeration of users of a mobile communication network, wherein determining each candidate point comprises:

determining a ratio of a first local user density to a second local user density corresponding to a respective candidate point, wherein the first local user density corresponds to a first distance zone of the user density map and the second local user density corresponds to a second distance zone of the user density map; and determining that the ratio exceeds a threshold;

determining the center point of the hotspot based on the plurality of candidate points; and outputting the determined center point of the hotspot for installation of a small cell at the center point of the hotspot, wherein the small cell is configured to serve the concentrated conglomeration of users to communicate via the mobile communication network.

14. The device of claim 13, further comprising:
an interface to the user localization system.

15. The device of claim 13, wherein the first distance zone and the second distance zone are circle rings around the respective candidate point.

* * * * *